United States Patent
Endo et al.

(10) Patent No.: US 10,937,321 B2
(45) Date of Patent: Mar. 2, 2021

(54) VEHICLE CONTROL DEVICE

(71) Applicant: HITACHI AUTOMOTIVE SYSTEMS, LTD., Hitachinaka (JP)

(72) Inventors: Takeshi Endo, Tokyo (JP); Takeshi Nagasaki, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 11 days.

(21) Appl. No.: 16/474,959

(22) PCT Filed: Mar. 2, 2018

(86) PCT No.: PCT/JP2018/007937
§ 371 (c)(1),
(2) Date: Jun. 28, 2019

(87) PCT Pub. No.: WO2018/168514
PCT Pub. Date: Sep. 20, 2018

(65) Prior Publication Data
US 2019/0347940 A1    Nov. 14, 2019

(30) Foreign Application Priority Data
Mar. 17, 2017  (JP) .............................. JP2017-052692

(51) Int. Cl.
*G08G 1/16*    (2006.01)
*G06T 7/70*    (2017.01)
(Continued)

(52) U.S. Cl.
CPC .............. *G08G 1/167* (2013.01); *B60Q 9/00* (2013.01); *G06F 3/14* (2013.01); *G06K 9/00798* (2013.01);
(Continued)

(58) Field of Classification Search
CPC .. G08G 1/167; G06T 7/70; B60Q 9/00; G06F 3/14; G06K 9/00798; G06K 9/00818
See application file for complete search history.

(56) References Cited

U.S. PATENT DOCUMENTS

| 6,472,977 | B1  | 10/2002 | Pochmuller |
| 2004/0042638 | A1* | 3/2004 | Iwano ................ G06K 9/00798 |
|  |  |  | 382/104 |

(Continued)

FOREIGN PATENT DOCUMENTS

| CN | 101315283 A | 12/2008 |
| JP | 2001-514110 A | 9/2001 |

(Continued)

OTHER PUBLICATIONS

International Search Report with English translation and Written Opinion issued in corresponding application No. PCT/JP2018/007937 dated Jun. 12, 2018.

(Continued)

*Primary Examiner* — Qun Shen
(74) *Attorney, Agent, or Firm* — Foley & Lardner LLP (57) ABSTRACT

In the present invention, sign information displayed on road signs installed above a road are associated with lanes more accurately. This vehicle control device 1 acquires the number of lanes, in the direction of movement of a host vehicle, on a road on which the host vehicle is traveling, and assigns a lane sequence code indicating the layout sequence to each of the lanes indicated by the number of lanes. The vehicle control device 1 acquires the position of a road sign installed above the road and sign information displayed on the road sign from a captured image of the road sign, and, if there are two or more items of sign information, assigns a sign information sequence code indicating the layout sequence to each of the items of sign information on the basis of the position of the road sign. The vehicle control device 1 then (Continued)

associates the lane and the item of sign information for which the layout sequence indicated by the lane sequence code and the layout sequence indicated by the sign information sequence code match.

6 Claims, 5 Drawing Sheets

(51) Int. Cl.
  *B60Q 9/00* (2006.01)
  *G06F 3/14* (2006.01)
  *G06K 9/00* (2006.01)

(52) U.S. Cl.
  CPC .......... *G06K 9/00818* (2013.01); *G06T 7/70* (2017.01); *G06T 2207/30242* (2013.01); *G06T 2207/30256* (2013.01)

(56) References Cited

U.S. PATENT DOCUMENTS

| | | | |
|---|---|---|---|
| 2006/0208923 A1* | 9/2006 | Tauchi | G08G 1/161 340/902 |
| 2009/0195411 A1 | 8/2009 | Ichihashi et al. | |
| 2010/0302361 A1 | 12/2010 | Yoneyama et al. | |
| 2011/0112756 A1 | 5/2011 | Winkler et al. | |
| 2015/0325127 A1* | 11/2015 | Pandita | G08G 1/166 701/431 |
| 2016/0171893 A1* | 6/2016 | Chen | G01S 15/931 701/300 |
| 2016/0350606 A1 | 12/2016 | Yoshitomi et al. | |
| 2016/0351051 A1* | 12/2016 | Murthy | B60R 1/00 |
| 2017/0174132 A1* | 6/2017 | Yokochi | G06K 9/78 |
| 2017/0178591 A1* | 6/2017 | Takatsudo | G09G 5/003 |
| 2017/0243491 A1* | 8/2017 | Fujii | B60W 30/12 |

FOREIGN PATENT DOCUMENTS

| | | |
|---|---|---|
| JP | 2009-187166 A | 8/2009 |
| JP | 2010-282278 A | 12/2010 |
| JP | 2011-527754 A | 11/2011 |
| JP | 2016-224718 A | 12/2016 |

OTHER PUBLICATIONS

Extended European Search Report issued in European Patent Application No. 18768054.1 dated Nov. 26, 2020 (10 pages).

* cited by examiner

VEHICLE CONTROL DEVICE

TECHNICAL FIELD

The present invention relates to a vehicle control device.

BACKGROUND ART

Vehicle control according to a recognition result of a road sign is important for realization of automatic driving and traffic accident prevention, and attracts great interest. Then, in order to perform vehicle control appropriately in accordance with a recognition result of a road sign, it is necessary to properly specify a road sign that regulates a host vehicle among road signs installed on a road. For example, PTL 1 discloses a limiting speed notification device that specifies, on a road with a plurality of lanes, an own-lane limiting speed on the basis of a speed limit sign, on a road surface of the own lane, taken by a camera mounted on the vehicle, and notifies a driver of the specified own-lane limiting speed.

CITATION LIST

Patent Literature

PTL 1: JP 2009-187166 A

SUMMARY OF INVENTION

Technical Problem

The above-mentioned limiting speed notification device is to specify an own-lane limiting speed on the basis of a speed limit sign drawn with paint on a road surface. As another configuration, a configuration is conceivable in which, for a signboard speed limit sign installed above a road, an own-lane limiting speed is specified in association with a lane directly below the speed limit sign. However, in such a configuration, if the signboard speed limit sign is installed after a road shape drawing a curve, there is a risk that a vertical positional relationship between the speed limit sign and the lane may be deviated to be recognized. This causes a problem that a sign of an adjacent lane is incorrectly associated with the own lane.

In view of the above problem, an object of the present invention is to provide a vehicle control device that can more accurately associate a lane with sign information displayed on a road sign installed above a road.

Solution to Problem

A vehicle control device of the present invention includes: a lane information acquisition unit that acquires at least a number of lanes in a direction of movement of a host vehicle on a road on which a host vehicle is traveling; a lane sequence code assignment unit that assigns a lane sequence code indicating a layout sequence to each lane indicated by the number of lanes acquired by the lane information acquisition unit; a sign information acquisition unit that acquires, from an image obtained by capturing a road sign installed above the road, a position of the road sign and sign information displayed on the road sign; a sign information sequence code assignment unit that assigns, when there are two or more items of the sign information acquired by the sign information acquisition unit, a sign information sequence code indicating a layout sequence to each of items of sign information on the basis of a position of the road sign; and a sign-lane association processing unit that associates the lane and the sign information for which a layout sequence indicated by the lane sequence code and a layout sequence indicated by the sign information sequence code match.

Advantageous Effects of Invention

According to the present invention, sign information displayed on a road sign installed above a road can be associated with a lane more accurately.

DESCRIPTION OF EMBODIMENTS

Hereinafter, embodiments of the present invention will be described in detail with reference to the drawings.

Figure 1:
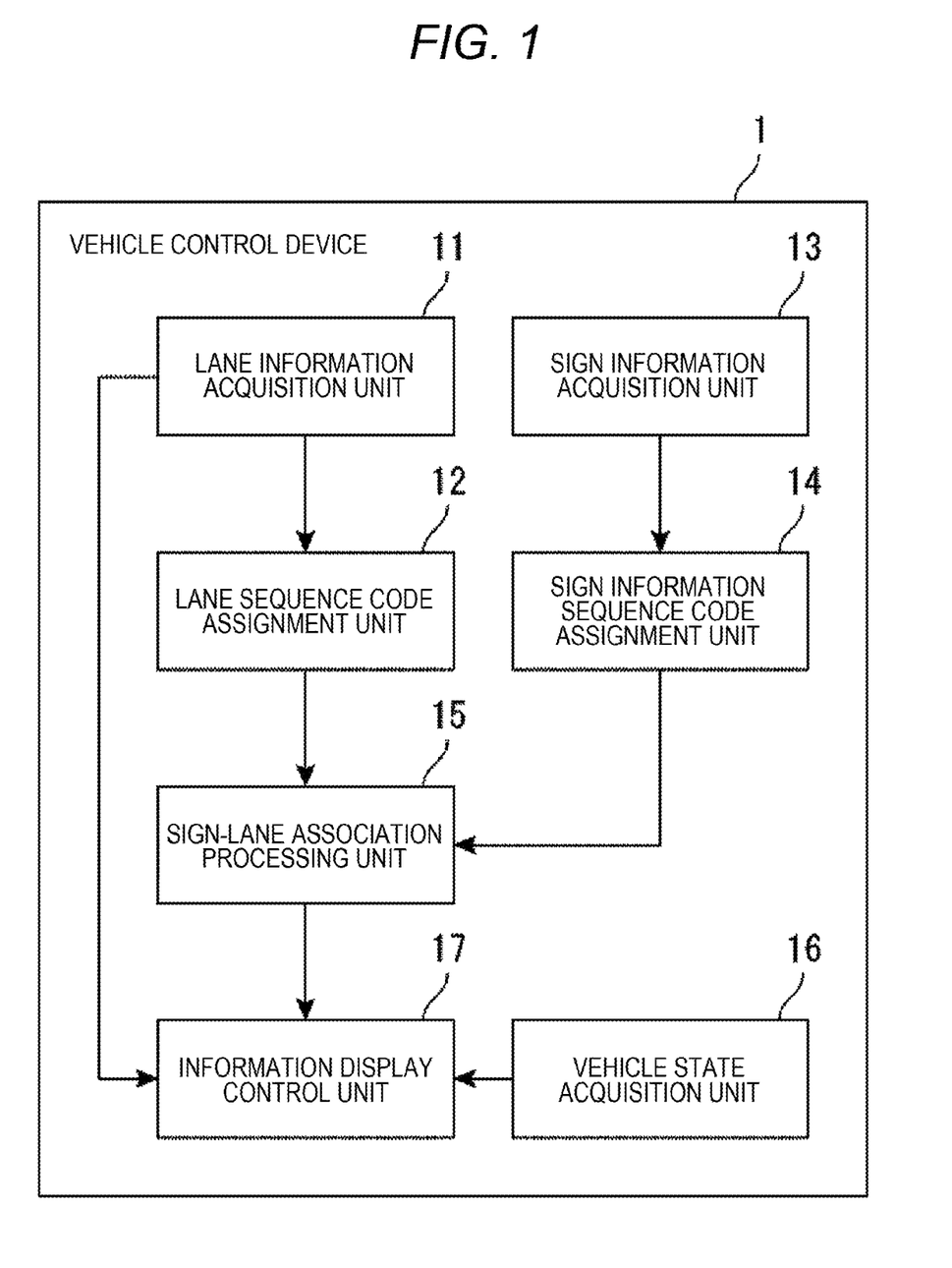
FIG. 1 is a functional block diagram showing a configuration of a vehicle control device according to an embodiment of the present invention.
Figure 2:
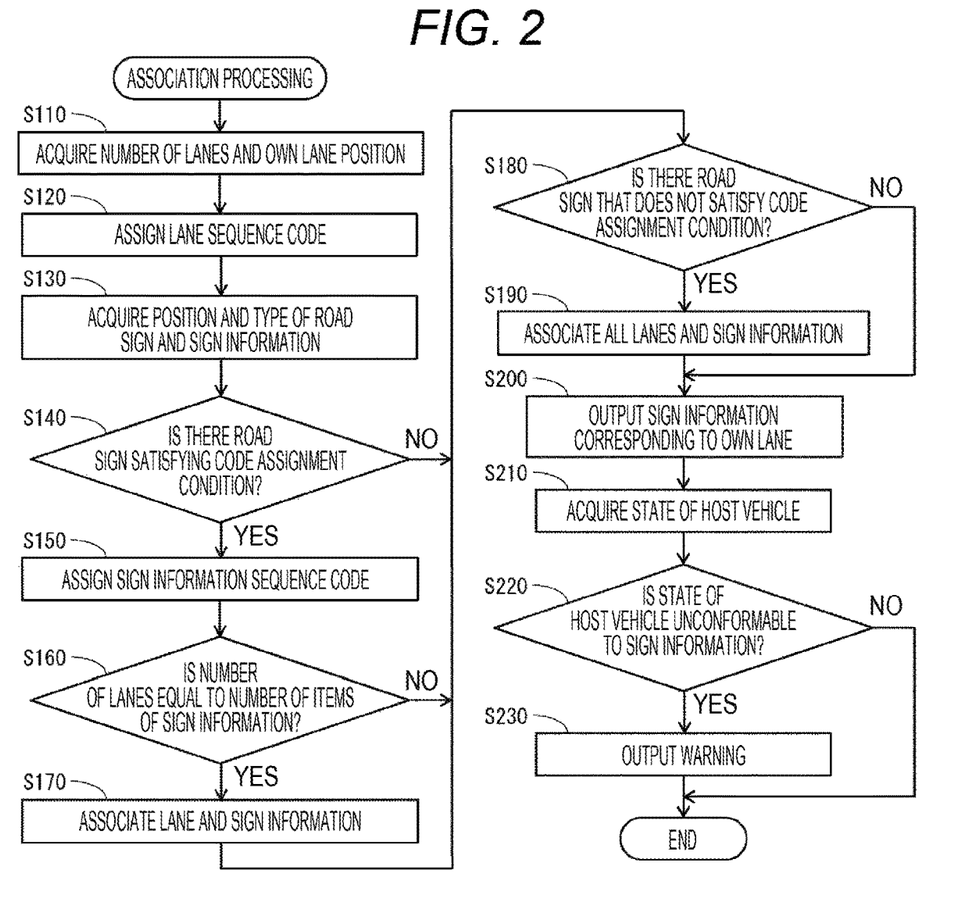
FIG. 2 is a flowchart showing an example of an operation of the vehicle control device in FIG. 1.

FIG. 1 is a functional block showing a configuration of a vehicle control device according to an embodiment of the present invention. FIG. 2 is a flowchart showing an example of an operation of the vehicle control device of FIG. 1.

A vehicle control device 1 according to the present embodiment is configured with a computer, a memory, a storage device, and the like, and the computer operates as various functional units by executing a control program stored in the memory or the like.

As shown in FIG. 1, as functional units realized by an operation of the computer, the vehicle control device 1 includes: a lane information acquisition unit 11; a lane sequence code assignment unit 12; a sign information acquisition unit 13; a sign information sequence code assignment unit 14; a sign-lane association processing unit 15, a vehicle state acquisition unit 16, and an information display control unit 17.

The lane information acquisition unit 11 acquires the number of lanes in a direction of movement of a host vehicle on a road on which the host vehicle is currently traveling, and a position of the lane on which the host vehicle is traveling (hereinafter referred to as "own lane position"), outputs the number of lanes to the lane sequence code assignment unit 12, and outputs the own lane position to the information display control unit 17.

In the present embodiment, the lane information acquisition unit 11 is connected with an on-vehicle camera (not shown) that captures the front of the host vehicle, and acquires the number of lanes and an own lane position by using an image captured by the on-vehicle camera. Specifically, the lane information acquisition unit 11 acquires the number of lanes and the own lane position associated with a highly relevant white line template image, by template matching processing using a white line template image prepared in advance. Alternatively, the lane information acquisition unit 11 may acquire the number of lanes and the own lane position by a statistical method using machine learning based on a large number of images obtained by capturing the road.

Alternatively, the lane information acquisition unit may be connected with a car navigation system (not shown), and the car navigation system may identify a road on which the host vehicle is traveling, by applying, to a map, position information of the host vehicle acquired on the basis of global positioning system (GPS) signals, and estimate the number of lanes in a direction of movement of the host vehicle on the road (e.g., "3" in a case of three lanes on one side) and the own lane position. Then, the lane information acquisition unit 11 may acquire the number of lanes and the own lane position from the car navigation system.

As long as the lane information acquisition unit 11 can detect the number of lanes and the own lane position, any method can be used.

The lane sequence code assignment unit 12 assigns, to a lane, a lane sequence code indicating a layout sequence. In the present embodiment, the lane sequence code assignment unit 12 detects a lane mode (one lane on one side, three lanes on one side, and the like) of the road on which the host vehicle is traveling, from the number of lanes outputted from the lane information acquisition unit 11. That is, the number of lanes indicates the lane mode. Then, in a case where the number of lanes is two or more, the lane sequence code assignment unit 12 assigns codes (numbers) in ascending order from a lane on one side (e.g., left side) of the road to a lane on the other side (e.g., right side). For example, in a case where the number of lanes is "3", the lane sequence code assignment unit 12 detects that the road has three lanes on one side, and assigns lane sequence codes of "lane 1", "lane 2", and "lane 3" to the three lanes sequentially from the left side. In a case where the number of lanes is one, the lane sequence code assignment unit 12 assigns a lane sequence code of "lane 1" to the one lane.

The lane sequence code assignment unit 12 outputs the lane sequence code to the sign-lane association processing unit 15.

The sign information acquisition unit 13 is connected with an on-vehicle camera (not shown) that captures the front of the host vehicle, analyzes an image transmitted from the on-vehicle camera to recognize and acquire a position of a road sign and sign information displayed on the road sign included in the image, and outputs the acquired position of the road sign and the sign information to the sign information sequence code assignment unit 14. In the present embodiment, the sign information acquisition unit 13 acquires sign information displayed on a road sign installed above a road and a road sign installed beside the road.

The sign information acquisition unit 13 specifies a position where a road sign is shown in the image. For example, when a target to be recognized is a circular or rectangular road sign, the sign information acquisition unit 13 detects an edge in the image, and performs a Hough transformation using the acquired edge to specify the position of the road sign in the image. Alternatively, the sign information acquisition unit 13 may extract a feature point by using an MSER algorithm or the like using density information of pixels or the like, and specify a position of the road sign in the image.

Figure 5:
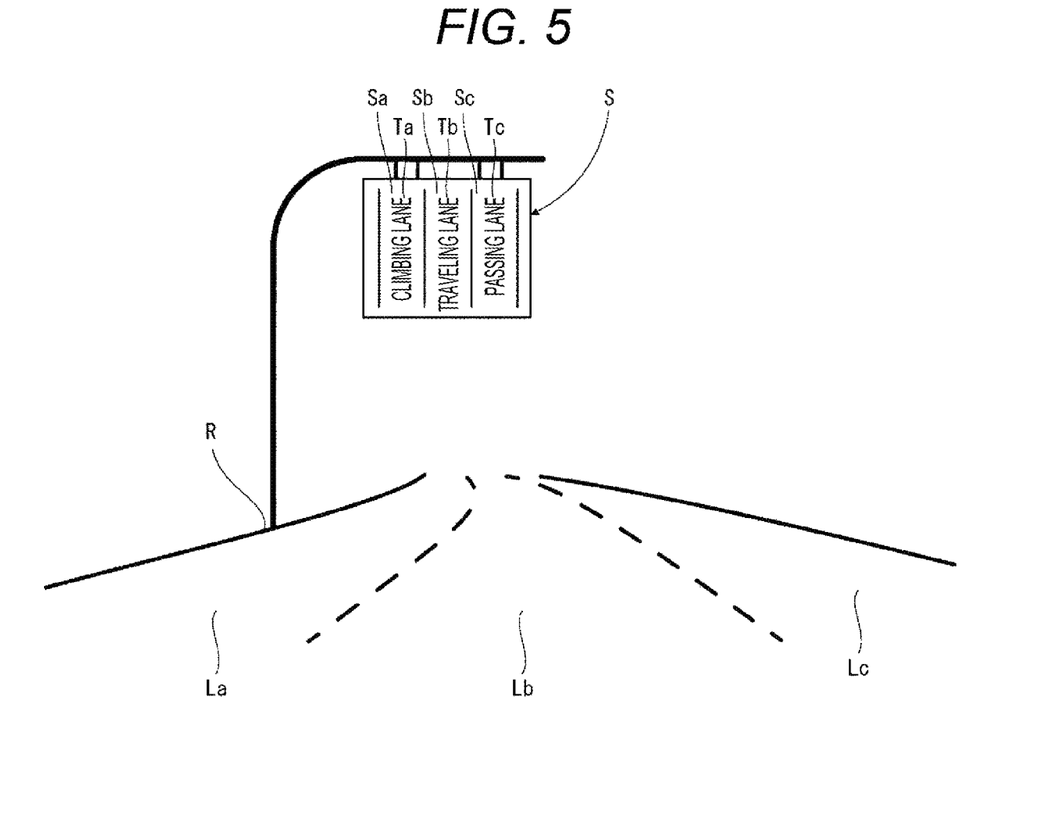
FIG. 5 is a view showing another example of a road and a road sign (an example in which one road sign including a plurality of items of sign information is installed above the road).

When having specified the position of the road sign in the image, the sign information acquisition unit 13 performs template matching processing using a sign template image of a recognition target for the specified position, and acquires a type of the road sign associated to a highly correlated sign template image, and the sign information displayed on the road sign. Alternatively, the sign information acquisition unit 13 may acquire the type of the road sign and the sign information displayed on the road sign by a statistical method using machine learning based on a large number of images obtained by capturing the road sign. Note that, in a case where a plurality of items of sign information are included in one road sign (for example, as illustrated in FIG. 5, when one signboard road sign displays a climbing lane, a traveling lane, and a passing lane) the sign information acquisition unit 13 performs processing on the assumption that there are a plurality of road signs each displaying one item of sign information.

Types of the road sign include, for example, maximum speed control, minimum speed control, parking prohibited, parking and stopping prohibited, traveling prohibited other than a specified direction (right turn/left turn prohibited, straight/right turn prohibited, right turn prohibited, and the like), and a lane type (climbing lane, traveling lane, passing lane, and the like). These types of the road sign are classified into two of: (1) "a type that can be applied to each lane," such as maximum speed control, minimum speed control, traveling prohibited other than a specified direction, and a lane type; and (2) "a type applied to all lanes" such as parking prohibited, and parking and stopping prohibited. Moreover, the sign information displayed on the road sign is to display a regulation and guidance such as a maximum speed value (80 km/h and the like), a minimum speed value (30 km/h and the like), parking prohibited, parking and stopping prohibited, right turn/left turn prohibited, straight/right turn prohibited, right turn prohibited, a climbing lane, a traveling lane, a passing lane, and the like.

Then, the sign information acquisition unit 13 outputs a position of the road sign, a type of the road sign and sign information displayed on the road sign in association with each other, to the sign information sequence code assignment unit 14.

The sign information sequence code assignment unit 14 assigns a sign information sequence code indicating a layout sequence, to the sign information acquired by the sign information acquisition unit 13. In the present embodiment, in a case where the type of the road sign outputted from the sign information acquisition unit 13 can be applied to each lane, and there are two or more road signs of this type, the sign information sequence code assignment unit 14, for these road signs, detects a positional relationship in a direction crossing the road on the basis of the position of the road sign, while assuming that the road sign having this type satisfies a code assignment condition. Then, similarly to the lane sequence code assignment unit 12, the sign information sequence code assignment unit 14 assigns codes (numbers) in ascending order from the sign information displayed on the road sign on one side (e.g., the left side) of the road to the sign information displayed on the road sign on the other side (e.g., the right side). For example, in a case where three signboard road signs indicating the lane type are arranged in the direction crossing the road, and display sign information of "climbing lane", "traveling lane", and "passing lane" sequentially from the left side, the sign information sequence code assignment unit 14 assigns sign information sequence codes of "sign information 1", "sign information 2", and "sign information 3" for the three items of sign information sequentially from the left side.

The sign information sequence code assignment unit 14 associates the sign information and the sign information sequence code with each other, and outputs to the sign-lane association processing unit 15. In addition, the sign information sequence code assignment unit 14 also outputs, even for a road sign that does not satisfy the above code assignment condition, sign information displayed on the road sign to the sign-lane association processing unit 15.

The sign-lane association processing unit 15 associates a lane with sign information applied to the lane. In the present embodiment, when the number of lanes assigned with the lane sequence code is equal to the number of items of sign information assigned with the sign information sequence code, the sign-lane association processing unit 15 associates a lane and sign information for which a layout sequence indicated by the lane sequence code and a layout sequence indicated by the sign information sequence code match.

Specifically, the sign-lane association processing unit 15 compares the number of lane sequence codes outputted from the lane sequence code assignment unit 12 (i.e., the number of lanes) with the number of items of sign information assigned with the sign information sequence code outputted from the sign information sequence code assignment unit 14. Then, when these numbers are equal to each other, the sign-lane association processing unit 15 associates a lane and sign information for which a layout sequence indicated by the lane sequence code and a layout sequence indicated by the sign information sequence code match.

For example, suppose that "lane 1", "lane 2", and "lane 3" are outputted as lane sequence codes, and "climbing lane, sign information 1", "traveling lane, sign information 2", and "passing lane, sign information 3" are outputted as sign information and the sign information sequence code thereof. In this case, the sign-lane association processing unit 15 associates the sign information ("climbing lane") in which the sign information sequence code is "sign information 1", with a lane in which the lane sequence code is "lane 1"; associates the sign information ("traveling lane") in which the sign information sequence code is "sign information 2", with a lane in which the lane sequence code is "lane 2"; and associates the sign information ("passing lane") in which the sign information sequence code is "sign information 3", with a lane in which the lane sequence code is "lane 3". As each code, other than numbers may be used as long as a layout sequence is indicated. For example, alphabets, Greek letters, hiragana, katakana, kanji, or a combination thereof and the like can be used. Meanwhile, the lane sequence code may be used as identification information for identifying a lane of a road.

In addition, when the output from the sign information sequence code assignment unit 14 includes sign information (i.e., sign information assigned with no identification information sequence code) displayed on a road sign that does not satisfy the above code assignment condition, the sign-lane association processing unit 15 associates this sign information with all the lanes.

The sign-lane association processing unit 15 outputs, to the information display control unit 17, the lane (lane sequence code) and the sign information that are associated with each other.

The vehicle state acquisition unit 16 is connected with other vehicle control devices, various sensors, and the like (not shown), and acquires a state of the host vehicle such as a traveling speed and an operation state of a turn indicator on the basis of signals outputted from these. The vehicle state acquisition unit 16 outputs the acquired state of the host vehicle to the information display control unit 17.

The information display control unit 17 outputs, for example, a display control signal for displaying a regulation, guidance, or a warning related to the lane on which the host vehicle is traveling, on a display unit (not shown) such as a combination meter or a car navigation system. Specifically, on the basis of the lane and the sign information outputted from the sign-lane association processing unit 15, and the own lane position outputted from the lane information acquisition unit 11, the information display control unit 17 detects sign information associated with the lane on which the host vehicle is traveling (i.e., the restriction, guidance, and the like related to the lane), and displays the sign information on the display unit.

In addition, when the state of the host vehicle outputted from the vehicle state acquisition unit 16 violates or is predicted to violate the above sign information, the information display control unit 17 displays a warning about the violation on the display unit. Note that, in the present embodiment, the display unit includes a display device such as a display or an LED lamp, and an acoustic device such as a buzzer or a speaker. Further, "displaying on a display unit" includes meaning of displaying characters or images on the display device, and meaning of outputting alarm sound or sound from the audio device.

Next, an example of an operation in the vehicle control device 1 of the present embodiment will be described with reference to the flowchart of FIG. 2.

The vehicle control device 1 acquires the number of lanes in a direction of movement of the host vehicle on a road on which the host vehicle is traveling and an own lane position, from a car navigation system (not shown) mounted on the host vehicle (S110), and assigns lane sequence codes to the lanes sequentially from the left side (S120).

Next, the vehicle control device 1 acquires a position of a road sign, a type of the road sign and sign information displayed on the road sign from an image outputted from the on-vehicle camera (not shown) mounted on the host vehicle (S130). Then, the vehicle control device 1 determines whether or not there is a road sign satisfying a code assignment condition (the type of road sign can be applied to each lane, and there are two or more road signs of this type) (S140).

When there is a road sign satisfying the code assignment condition (S140: YES), the vehicle control device 1 assigns a sign information sequence code to the sign information displayed on the road sign satisfying the condition sequentially from the left side (S150). Then, when the number of lanes is equal to the number of items of sign information satisfying the above code assignment condition (S160: YES), the vehicle control device 1 associates a lane and sign information for which a layout sequence indicated by the lane sequence code and a layout sequence indicated by the sign information sequence code match (S170). When the numbers are not equal to each other (S160: NO), the process is advanced without the association.

When there is no road sign satisfying the code assignment condition (S140: NO), or after processing related to the association of the lane and the sign information (S160, S170), the vehicle control device 1 determines whether or not there is a road sign that does not satisfy the code assignment condition (S180).

When there is a road sign that does not satisfy the code assignment condition (S180: YES), that is, when the type of road sign can be applied to all lanes, and the number of road signs of this type is one, the vehicle control device 1 associates the sign information displayed on the road sign with all the lanes (S190). When there is no such road sign (S180: NO), the process is advanced without the association.

Next, the vehicle control device 1 transmits, to the display unit, a display control signal indicating the sign information associated with the lane on which the host vehicle is traveling (S200). In response to the display control signal, the display unit displays sign information associated with the lane on which the host vehicle is traveling.

Next, the vehicle control device 1 acquires a state of the host vehicle such as a traveling speed of the host vehicle and an operation state of the turn indicator, from other vehicle control devices and various sensors (not shown) (S210). Then, the vehicle control device 1 determines whether or not the state of the host vehicle conforms to the sign information associated with the lane (S220).

When the state of the host vehicle does not conform to the sign information associated with the lane (YES in S220), the vehicle control device 1 outputs a display control signal for displaying a warning to that effect to the display unit (S230), and ends the process. When the state of the host vehicle conforms, the vehicle control device 1 ends the process without outputting the display control signal (NO in S220). When receiving the display control signal, the display unit displays a warning.

Operation Example 1

Figure 3:
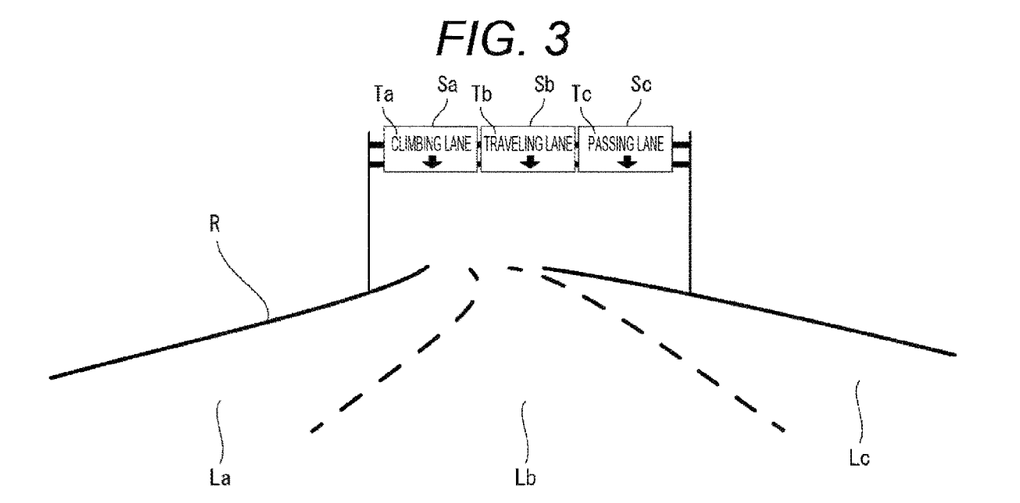
FIG. 3 is a view showing an example of a road and a road sign (an example in which three road signs are installed above the road).

Next, an operation example of the vehicle control device 1 when the host vehicle travels on a road shown in FIG. 3 will be described. A road R shown in FIG. 3 has three lanes La, Lb, and Lc on one side, and three road signs Sa, Sb, and Sc are installed thereabove. The road signs Sa, Sb, and Sc each display sign information Ta, Tb, and Tc. A type of the road signs Sa, Sb, and Sc is "lane type". It is assumed that the host vehicle is traveling on a central lane Lb.

Figure 4:
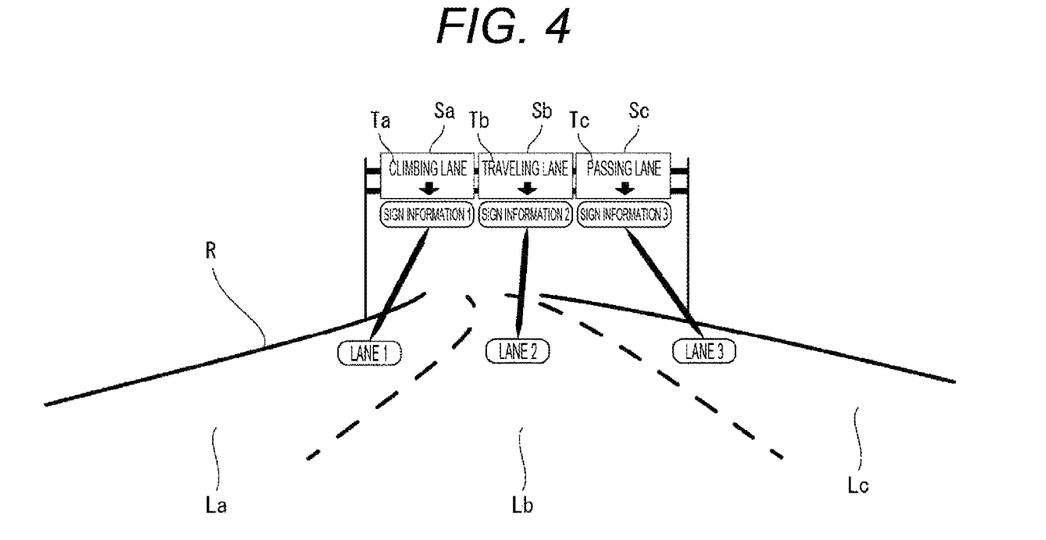
FIG. 4 is a view for explaining an operation in traveling on the road of FIG. 3.

The vehicle control device 1 acquires the number of lanes La, Lb, and Lc ("3") in a direction of movement of the host vehicle on the road R, and an own lane position ("central lane Lb") (S110). Then, as shown in FIG. 4, the vehicle control device 1 assigns lane sequence codes of "lane 1", "lane 2", and "lane 3" to the lanes La, Lb, and Lc sequentially from the left side (S120).

Next, the vehicle control device 1 acquires a position and a type of the road signs Sa, Sb, and Sc and the sign information Ta, Tb, and Tc ("climbing lane", "traveling lane", and "passing lane") indicated respectively, from an image outputted from the on-vehicle camera (S130). Types of the acquired road signs Sa, Sb, and Sc are all "lane type". The acquired sign information Ta, Tb, and Tc are "climbing lane", "traveling lane", and "passing lane" sequentially from the left.

Then, since the type ("lane type") of the road signs Sa, Sb, and Sc can be applied to each lane, and there are three road signs of this type (S140: YES), the vehicle control device 1, as shown in FIG. 4, assigns sign information sequence codes of "sign information 1", "sign information 2", and "sign information 3" to individual sign information Ta, Tb, and Tc sequentially from the left side, while assuming that the road signs Sa, Sb, and Sc each satisfy the code assignment condition (S150).

Next, since the number of the lanes La, Lb, and Lc ("3") is equal to the number of items of the sign information Ta, Tb, and Tc ("3") assigned with the sign information sequence codes (YES in S160), the vehicle control device 1 associates the sign information Ta, Tb, and Tc with the lanes La, Lb, and Lc for which a layout sequence indicated by the lane sequence code and a layout sequence indicated by the sign information sequence code match (S170). Specifically, the vehicle control device 1 associates the sign information Ta ("climbing lane") in which the sign information sequence code is "sign information 1", with the lane La in which the lane sequence code is "lane 1"; associates the sign information Tb ("traveling lane") in which the sign information sequence code is "sign information 2", with the lane Lb in which the lane sequence code is "lane 2"; and associates the sign information Tc ("passing lane") in which the sign information sequence code is "sign information 3", with the lane Lc in which the lane sequence code is "lane 3". Table shows a correspondence between a lane and sign information.

TABLE 1

| Lane | Sign information |
| --- | --- |
| Lane La | Climbing lane |
| Lane Lb | Traveling lane |
| Lane Lc | Passing lane |

Then, since there is no road sign that does not satisfy the code assignment condition (S180: NO), the vehicle control device 1 outputs, to the display unit, a display control signal indicating the sign information Tb associated with the lane Lb on which the host vehicle is traveling (S200), and displays, on the display unit, that the lane Lb on which the host vehicle is traveling is the sign information Tb "traveling lane". Further, the vehicle control device 1 acquires a state of the host vehicle (S210), and ends the process since the state of the host vehicle conforms to the sign information Tb "traveling lane" of the lane Lb (here, it is regarded to conform since "traveling lane" is not a regulation but is guidance) (S220: NO).

Note that the vehicle control device 1 performs an operation similar to that described above also on a road R shown in FIG. 5. The road R shown in FIG. 5 has three lanes La, Lb, and Lc, and one road sign S is installed thereabove. The road sign S shows sign information Ta, Tb, and Tc. In this case, the vehicle control device 1 operates on the assumption that three road signs Sa, Sb, and Sc indicating the sign information Ta, Tb, and Tc are installed.

Operation Example 2

Figure 6:
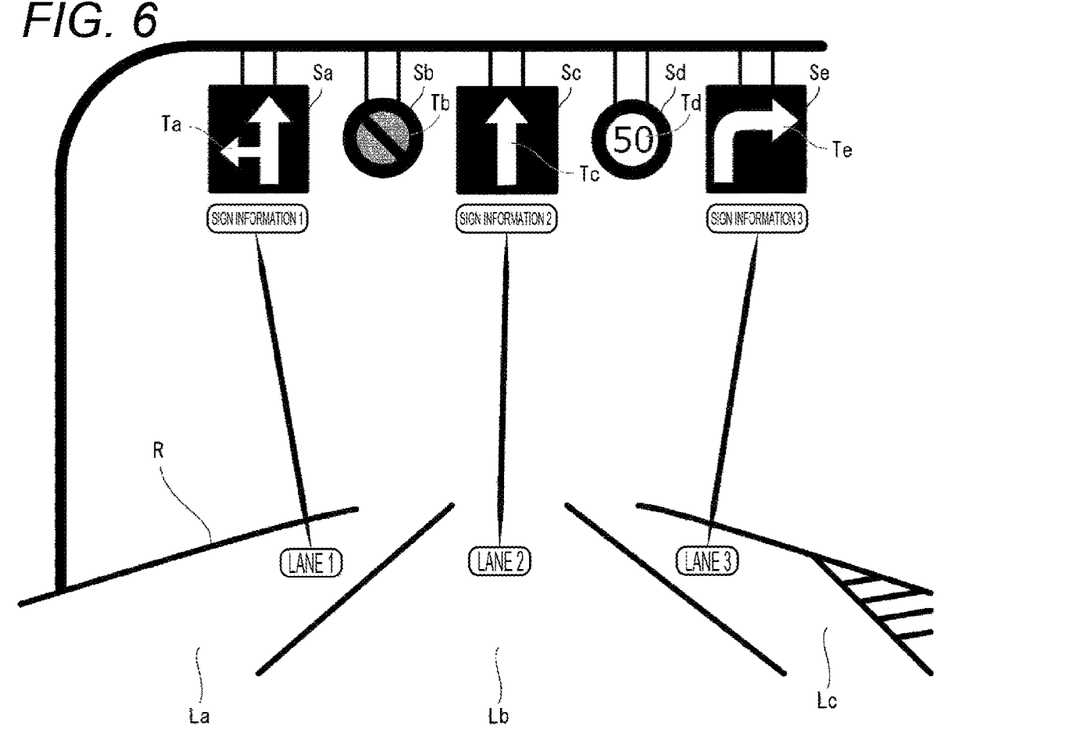
FIG. 6 is a view for explaining another example of a road and a road sign (an example in which five road signs are installed above the road), and an operation in traveling on this road.

Next, an operation example of the vehicle control device 1 when the host vehicle travels on a road shown in FIG. 6 will be described. A road R shown in FIG. 6 has three lanes La, Lb, and Lc on one side, and five road signs Sa, Sb, Sc, Sd, and Se are installed thereabove. The road signs Sa, Sb, Sc, Sd, and Se each display sign information Ta, Tb, Tc, Td, and Td. A type of the road signs Sa, Sc, and Se is "traveling prohibited other than a specified direction", a type of the road sign Sb is "parking prohibited", and a type of the road sign Sd is "maximum speed control". It is assumed that the host vehicle is traveling at a speed of 60 km/h on a central lane Lb.

The vehicle control device 1 acquires the number of lanes La, Lb, and Lc ("3") in a direction of movement of the host vehicle on the road R, and an own lane position ("central lane Lb") (S110). Then, as shown in FIG. 6, the vehicle control device 1 assigns lane sequence codes of "lane 1", "lane 2", and "lane 3" to the lanes La, Lb, and Lc sequentially from the left side (S120).

Next, the vehicle control device 1 acquires a position and a type of the road signs Sa, Sb, Sc, Sd, and Se and the sign information Ta, Tb, Tc, Td, and Te indicated respectively, from an image outputted from the on-vehicle camera (S130). The types of the acquired road signs Sa, Sb, Sc, Sd, and Se are, sequentially from the left, "traveling prohibited other than a specified direction", "parking prohibited", "traveling prohibited other than a specified direction", "maximum speed control", and "traveling prohibited other than a specified direction". The acquired sign information Ta, Tb, Tc, Td, and Te are, sequentially from the left, "right turn prohibited", "parking prohibited", "right turn/left turn prohibited", "maximum speed value (50 km/h)", and "straight/left turn prohibited".

Then, since the type ("traveling prohibited other than a specified direction") of the road signs Sa, Sc, and Se can be applied to each lane, and there are three road signs of this type (S140: YES), the vehicle control device 1, as shown in FIG. 6, assigns sign information sequence codes of "sign information 1", "sign information 2", and "sign information 3" to individual sign information Ta, Tc, and Te sequentially from the left side, while assuming that the road signs Sa, Sc, and Se each satisfy the code assignment condition (S150). In addition, since the road signs Sb and Sd do not satisfy the code assignment condition, the vehicle control device 1 does not assign the sign information sequence code.

Next, since the number of the lanes La, Lb, and Lc ("3") is equal to the number of items of the sign information Ta, Tb, and Tc ("3") assigned with the sign information sequence codes (S160:YES), the vehicle control device 1 associates the sign information Ta, Tc, and Te with the lanes La, Lb, and Lc for which a layout sequence indicated by the lane sequence code and a layout sequence indicated by the sign information sequence code match (S170). Specifically, the vehicle control device 1 associates the sign information Ta ("right turn prohibited") in which the sign information sequence code is "sign information 1", with the lane La in which the lane sequence code is "lane 1"; associates the sign information Tc ("right turn/left turn prohibited") in which the sign information sequence code is "sign information 2", with the lane Lb in which the lane sequence code is "lane 2"; and associates the sign information Te ("straight/left turn prohibited") in which the sign information sequence code is "sign information 3", with the lane Lc in which the lane sequence code is "lane 3".

Further, since there are road signs Sb and Sd that do not satisfy the code assignment condition (YES in S180), the vehicle control device 1 associates the sign information Tb and Td ("parking prohibited" and "maximum speed value (50 km/h)") indicated by these road signs Sb and Sd, with all the lanes La, Lb, and Lc (S190). Table 2 shows a correspondence between a lane and sign information.

TABLE 2

| Lane | Sign information |
| --- | --- |
| Lane La | Right turn prohibited, Parking prohibited, Maximum speed value (50 km/h) |
| Lane Lb | Right turn/left turn prohibited, Parking prohibited, Maximum speed value (50 km/h) |
| Lane Lc | Straight/left turn prohibited, Parking prohibited, Maximum speed value (50 km/h) |

Then, the vehicle control device 1 outputs, to the display unit, a display control signal indicating the sign information Tb, Tc, and Td associated with the lane Lb on which the host vehicle is traveling (S200), to display on the display unit that the lane Lb on which the host vehicle is traveling is "parking prohibited", "right turn/left turn prohibited", and "maximum speed 50 km/h". Further, the vehicle control device 1 acquires a state of the host vehicle (S210). Since the state of the host vehicle (60 km/h) does not conform to the "maximum speed 50 km/h" of the lane Lb (S220: YES), the vehicle control device 1 outputs, to the display unit, a display control signal for giving a warning that the maximum speed value is exceeded (S230), and displays the warning on the display unit. Then, the vehicle control device 1 ends the process.

Operation Example 3

Figure 7:
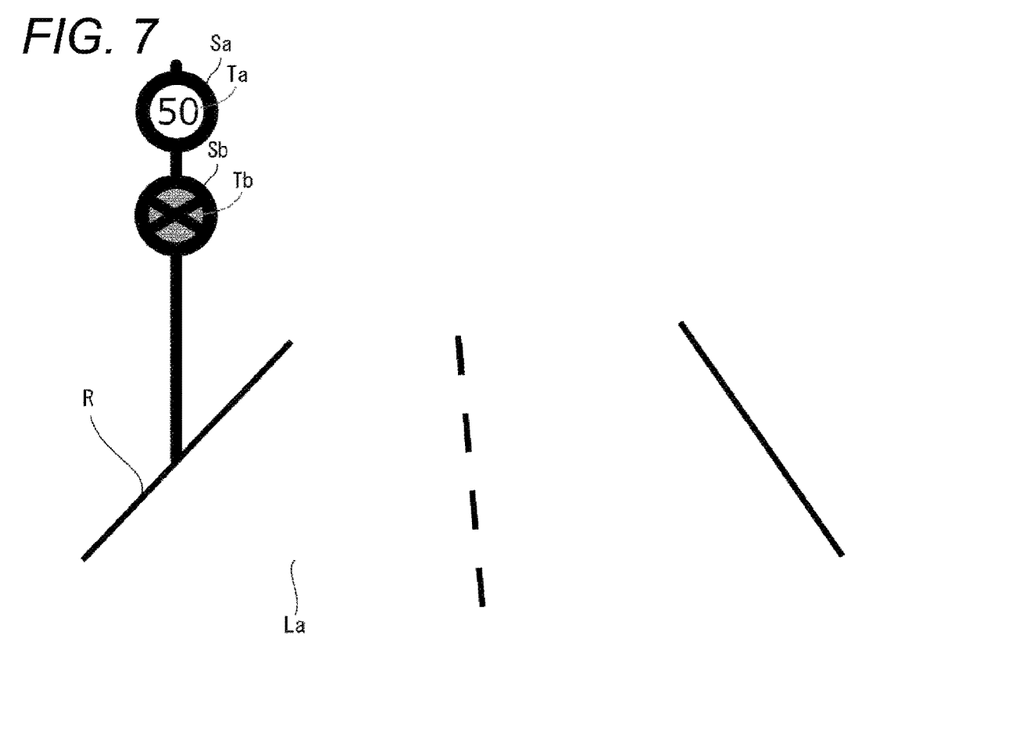
FIG. 7 is a view showing another example of a road and a road sign (a case where a road sign is installed beside the road).

Next, an operation example of the vehicle control device 1 when the host vehicle travels on a road shown in FIG. 7 will be described. A road R shown in FIG. 7 has one lane La on one side, and two road signs Sa and Sb are installed beside thereof. The road signs Sa and Sb each display sign information Ta and Tb. A type of the road sign Sa is "maximum speed control", and a type of the road sign Sb is "parking and stopping prohibited". It is assumed that the host vehicle is traveling at a speed of 60 km/h on the lane La.

The vehicle control device 1 acquires the number of lanes La ("1") in a direction of movement of the host vehicle on the road R, and an own lane position ("lane La") (S110). Then, the vehicle control device 1 assigns a lane sequence code of "lane 1" to the lane La (S120).

Next, the vehicle control device 1 acquires a position and a type of the road signs Sa and Sb and the sign information Ta and Tb (sequentially from the top, "maximum speed value (50 km/h)" and "parking and stopping prohibited") indicated respectively, from an image outputted from the on-vehicle camera (S130). Then, although a type of the road sign Sa ("maximum speed control") can be applied to each lane, the vehicle control device 1 does not assign the sign information sequence code, while assuming that both the road signs Sa and Sb each do not satisfy the code assignment condition, since there is only one road sign of this type and the type of road sign Sb ("parking and stopping prohibited") is applied to all lanes (S140: NO).

Then, since there are the road signs Sa and Sb that do not satisfy the code assignment condition (S180: YES), the vehicle control device 1 associates the lane La with the sign information Ta and Tb ("maximum speed value (50 km/h)" and "parking and stopping prohibited") indicated by these road signs Sa and Sb (S190).

Table 3 shows a correspondence between a lane and sign information.

TABLE 3

| Lane | Sign information |
|------|------------------|
| Lane La | Maximum speed value (50 km/h), Parking and stopping prohibited |

Then, the vehicle control device 1 outputs, to the display unit, a display control signal indicating the sign information Ta and Tb associated with the lane La on which the host vehicle is traveling (S200), and displays on the display unit that the lane Lb on which the host vehicle is traveling is "maximum speed value (50 km/h)" and "parking and stopping prohibited". Further, the vehicle control device 1 acquires a state of the host vehicle (S210). Since the state of the host vehicle (60 km/h) does not conform to the "maximum speed 50 km/h" of the lane La (S220: YES), the vehicle control device 1 outputs, to the display unit, a display control signal for giving a warning that the maximum speed value is exceeded (S230), and displays the warning on the display unit. Then, the vehicle control device 1 ends the process.

From the above, in the vehicle control device 1 of the present embodiment, the vehicle control device 1 acquires the number of lanes in a direction of movement of the host vehicle on a road on which the host vehicle is traveling, and assigns a lane sequence code indicating a layout sequence, to each lane indicated by the number of lanes (i.e., the lane counted as the number of lanes). Further, the vehicle control device 1 acquires, from an image obtained by capturing a road sign installed above the road, a position of the road sign and sign information displayed on the road sign, and assigns, when there are two or more items of the sign information, a sign information sequence code indicating a layout sequence to each of items of sign information on the basis of a position of the road sign. The vehicle control device 1 then associates the lane and the item of sign information for which the layout sequence indicated by the lane sequence code and the layout sequence indicated by the sign information sequence code match. Owing to this, since the lane and the sign information displayed on the road sign are acquired separately, a code indicating the layout sequence is assigned, and the lane is associated with the sign information on the basis of this code. Therefore, the lane and the road sign (sign information) can be appropriately associated even if positions of the lane and the road sign thereabove are seemingly deviated due to influence of a road shape.

Further, since the vehicle control device 1 assigns the sign information sequence code to the sign information displayed on the road sign satisfying the code assignment condition, it is possible to set whether or not to assign the sign information sequence code depending on the code assignment condition. Therefore, it is possible to more appropriately associate a lane with sign information by appropriately setting the code assignment condition.

Further, since the vehicle control device 1 associates, with all the lanes, the sign information that is not assigned with the sign information sequence code as not satisfying the code assignment condition, it is possible to appropriately discriminate the sign information to be associated with each lane and the sign information to be associated with all the lanes by the code assignment condition, and more appropriately associate the lane and the lane information. Thus, even in a scene where a road sign of the type that can be applied to each lane and a road sign of the type that is applied to all the lanes are mixed, it is possible to appropriately associate each lane with the sign information displayed on the road sign.

Further, in the vehicle control device 1, the code assignment condition is defined as that the road sign has a type that can be applied to each lane, and that there are two or more road signs of this type. Therefore, it is possible to appropriately discriminate the sign information to be associated with each lane and the sign information to be associated with all the lanes by the code assignment condition, and more appropriately associate the lane and the lane information.

Moreover, since the vehicle control device 1 acquires the sign information displayed on the road sign from an image obtained by capturing the road sign installed beside the road, the sign information of the road sign beside the road can be associated with the lane in addition to the road sign installed above the road.

Further, since the vehicle control device 1 acquires the own lane position indicating the position of the lane on which the host vehicle is traveling, and outputs the display control signal for displaying the sign information associated with the lane indicated by the own lane position, a passenger can be informed of a regulation and guidance of the lane on which the host vehicle is traveling.

In addition, since the vehicle control device acquires a state of the host vehicle, and outputs a display control signal for displaying a warning when the state of the host vehicle does not conform to the sign information associated with the lane indicated by the own lane position, it is possible to warn the passenger of an inappropriate vehicle condition.

As described above, although the vehicle control device 1 according to an embodiment of the present invention has been explained, the present invention is not limited to the configuration of this embodiment.

For example, while the vehicle control device 1 described above has a configuration that associates a lane and a road sign, it is also possible to adopt, in addition to this, a configuration that also associates an auxiliary sign that supplements the road sign.

Specifically, in the vehicle control device 1 described above, by analyzing an image transmitted from the on-vehicle camera, the sign information acquisition unit 13 recognizes and acquires a position of the road sign and sign information displayed on the road sign included in the image, and a position of the auxiliary sign and auxiliary sign information displayed on the auxiliary sign, and outputs those to the sign information sequence code assignment unit 14.

The sign information sequence code assignment unit 14 assigns a sign information sequence code to the sign information displayed on the road sign satisfying the code assignment condition, and further, associates the sign information displayed on the road sign and the auxiliary sign information displayed on the auxiliary sign vertically aligned, on the basis of the position of the road sign and the position of the auxiliary sign outputted from the sign information acquisition unit. At this time, when the sign information sequence code has been assigned to the sign information, the same sign information sequence code is also assigned to the auxiliary sign information corresponding to the sign information.

Then, the sign-lane association processing unit 15 associates a lane, sign information, and auxiliary sign information for which a layout sequence indicated by the lane sequence code and a layout sequence indicated by the sign information sequence code match. Further, the sign-lane association processing unit 15 associates the sign information assigned with no identification information sequence code and the auxiliary sign information corresponding thereto, with all the lanes.

Figure 8:
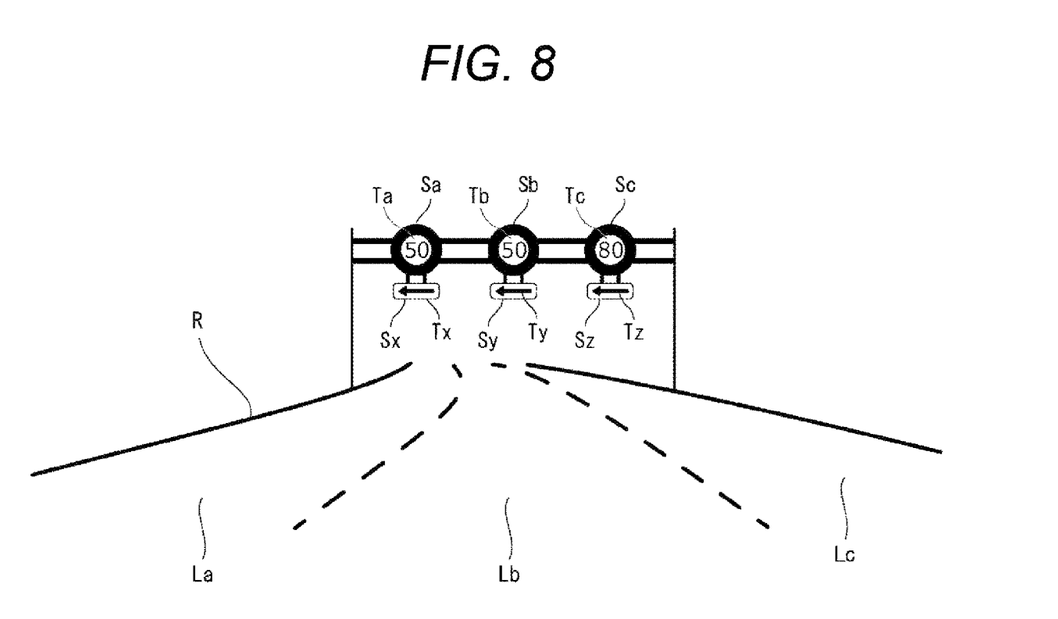
FIG. 8 is a view showing another example of a road and a road sign (an example in which three road signs and three auxiliary signs corresponding to the respective road signs are installed in information of the road).

A description is given to the association of the lane, the sign information, and the auxiliary sign information, for example, in a case where the vehicle control device 1 having such a configuration travels on a road R shown in FIG. 8. The road R shown in FIG. 8 has three lanes La, Lb, and Lc on one side, and three road signs Sa, Sb, and Sc and auxiliary signs Sx, Sy, and Sz are installed thereabove. The road signs Sa, Sb, and Sc each display sign information Ta, Tb, and Tc. A type of road signs Sa, Sb, and Sc is "maximum speed control". The auxiliary signs Sx, Sy, and Sz each display auxiliary sign information Tx, Ty, and Tz. A type of the auxiliary signs Sx, Sy, and Sz is "end of application section". The road signs Sa, Sb, and Sc and the auxiliary signs Sx, Sy, and Sz correspond to each other between signs aligned in the vertical direction.

In this case, the vehicle control device 1 assigns lane sequence codes of "lane 1", "lane 2", and "lane 3" to the lanes La, Lb, and Lc, and assigns sign information sequence codes of "sign information 1", "sign information 2", and "sign information 3" to the sign information Ta, Tb, and Tc. Furthermore, the vehicle control device 1 assigns, to the auxiliary sign information Tx, Ty, and Tz, sign information sequence codes of "sign information 1", "sign information 2", and "sign information 3" same as those of the sign information Ta, Tb, and Tc corresponding to the auxiliary sign information Tx, Ty, and Tz.

Then, the vehicle control device 1 associates the sign information Ta and the auxiliary sign information Tx ("maximum speed value (50 km/h)" and "end of application section") in which the sign information sequence code is "sign information 1", with the lane La in which the lane sequence code is "lane 1"; associates the sign information Tb and the auxiliary sign information Ty ("maximum speed value (50 km/h)" and "end of application section") in which the sign information sequence code is "sign information 2", with the lane Lb in which the lane sequence code is "lane 2"; and associates the sign information Tc and the auxiliary sign information Tz ("maximum speed value (60 km/h)" and "end of application section") in which the sign information sequence code is "sign information 3", with the lane Lc in which the lane sequence code is "lane 3".

By adopting such a configuration, in a case where the road sign and the corresponding auxiliary sign correspond to each lane or all lanes, it is possible to accurately associate, with a lane, the sign information displayed on the road sign and the auxiliary sign information displayed on the auxiliary sign.

Further, in the embodiment described above, a configuration may be adopted in which an order of a process of assigning a lane sequence code (S110 and S120 in FIG. 2) and a process of assigning a sign information sequence code (S130 to S190 in FIG. 2) is switched, and a process of assigning a lane sequence code is not performed when there is only sign information to be applied to all the lanes, in a process of assigning a sign information sequence code. Owing to this, it is possible to shorten an overall processing time by omitting the process of assigning a lane sequence code in a case of only the sign information to be applied to all the lanes.

Further, in the embodiment described above, the lane sequence code and the sign information sequence code are codes indicating a layout sequence from the left order, but the invention is not limited thereto. For example, a code indicating a layout sequence from the right side, center, and the like may be assigned, and any method can be used for assigning the code as long as a lane and sign information can be properly associated.

As described above, the embodiment of the present invention has been described in detail with use of the drawings, but the specific configuration is not limited to this embodiment, and various modifications are included. For example, the embodiment described above has been illustrated in detail to facilitate description for easy understanding of the present invention, and is not necessarily limited to the embodiment that includes all the configurations. Even if there are design changes and the like without departing from the scope of the present invention, they are included in the present invention.

REFERENCE SIGNS LIST

1 vehicle control device
11 lane information acquisition unit
12 lane sequence code assignment unit
13 sign information acquisition unit
14 sign information sequence code assignment unit
15 sign-lane association processing unit
16 vehicle state acquisition unit
17 information display control unit
R road
La, Lb, Lc lane
Sa, Sb, Sc, Sd, Se road sign
Sx, Sy, Sz auxiliary sign
Ta, Tb, Tc, Td, Te sign information
Tx, Ty, Tz auxiliary sign information

The invention claimed is:

1. A vehicle control device comprising:
at least one computer configured to:
acquire at least a number of lanes in a direction of movement of a host vehicle on a road on which a host vehicle is traveling;
assign a lane sequence code indicating a layout sequence to each lane indicated by the number of lanes acquired by the lane information acquisition unit;
acquire, from an image obtained by capturing a road sign installed above the road, a position of the road sign and sign information displayed on the road sign;
assign, when there are two or more items of the sign information acquired by the at least one computer, a sign information sequence code indicating a layout sequence to each of items of sign information based on a position of the road sign; and
associate the lane and the sign information for which a layout sequence indicated by the lane sequence code and a layout sequence indicated by the sign information sequence code match,
wherein the at least one computer is configured to assign the sign information sequence code to the sign information displayed on the road sign satisfying a code assignment condition, and
wherein the at least one computer is configured to associate, with all the lanes, the sign information not assigned with the sign information sequence code that does not satisfy the code assignment condition.

2. The vehicle control device according to claim 1, wherein the code assignment condition is defined as that the road sign has a type that can be applied for each lane, and there are two or more of the road signs of the type.

3. The vehicle control device according to claim 1, wherein the at least one computer is configured to:
acquire, from the image, a position of the road sign and sign information displayed on the road sign, and a position of an auxiliary sign that supplements the road sign and auxiliary sign information displayed on the auxiliary sign,
assign the sign information sequence code same as that of the sign information, to the auxiliary sign information corresponding to the sign information assigned with the sign information sequence code, based on a position of the road sign and a position of the auxiliary sign, and
associate the lane, the sign information, and the auxiliary sign information for which a layout sequence indicated by the lane sequence code and a layout sequence indicated by the sign information sequence code match.

4. The vehicle control device according to claim 1, wherein the at least one computer is configured to acquire sign information displayed on the road sign, from an image obtained by capturing a road sign installed beside the road.

5. The vehicle control device according to claim 1, wherein
the at least one computer is configured to acquire an own lane position indicating a position of a lane on which a host vehicle is traveling, and
the vehicle control device further includes an information display controller configured to output a display control signal for displaying the sign information associated with a lane indicated by the own lane position.

6. The vehicle control device according to claim 5, wherein the at least one computer is configured to acquire a state of a host vehicle, wherein
the information display controller is configured to output a display control signal for displaying a warning when a state of a host vehicle does not conform to the sign information associated with a lane indicated by the own lane position.

* * * * *